Dec. 12, 1944.  W. A. SHURCLIFF  2,364,825
SPECTROPHOTOMETER ATTACHMENT FOR REJECTING SPECULAR REFLECTIONS
Filed Feb. 13, 1942
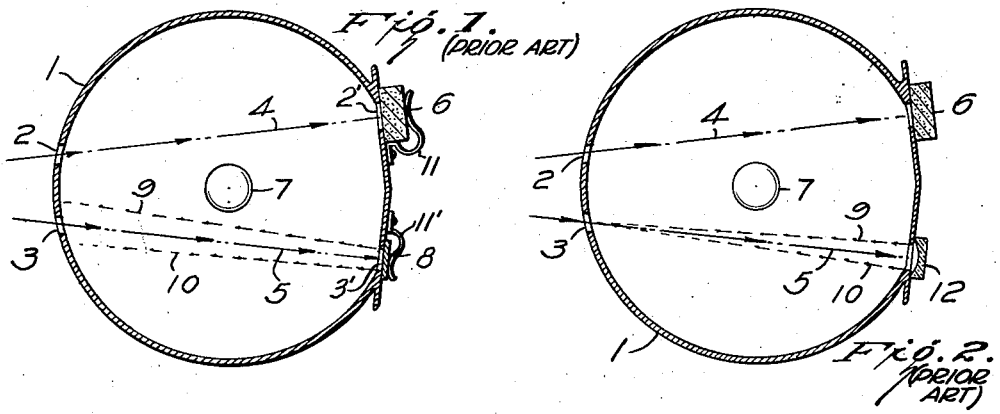
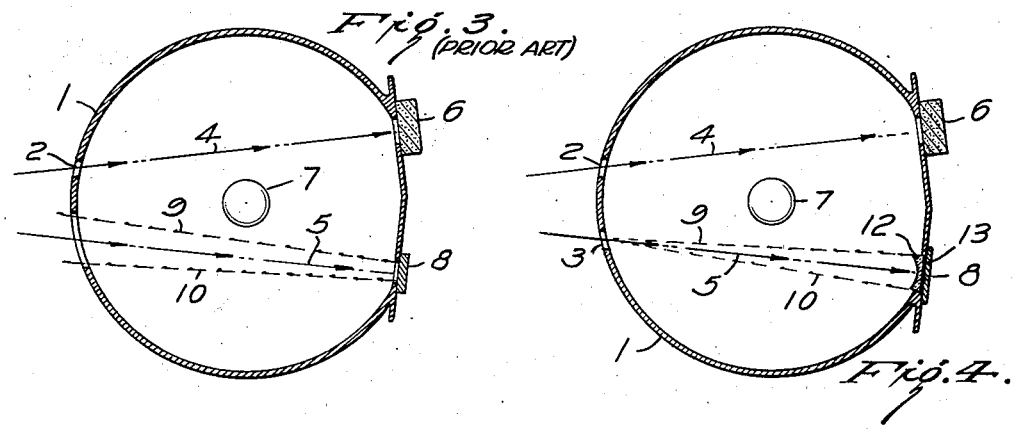
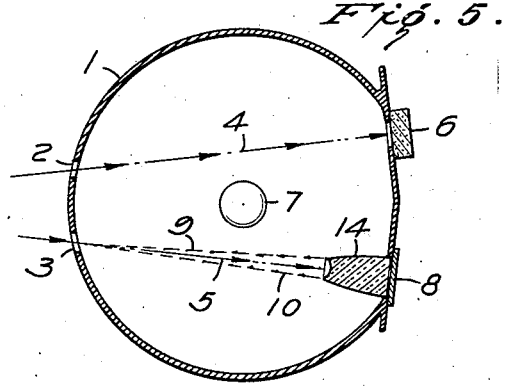
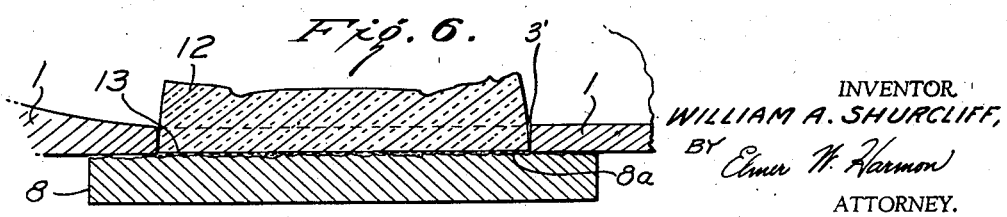
INVENTOR.
WILLIAM A. SHURCLIFF,
BY Elmer W. Harmon
ATTORNEY.

Patented Dec. 12, 1944

2,364,825

UNITED STATES PATENT OFFICE 2,364,825

SPECTROPHOTOMETER ATTACHMENT FOR REJECTING SPECULAR REFLECTION

William A. Shurcliff, Plainfield, N. J., assignor to American Cyanamid Company, New York, N. Y., a corporation of Maine Application February 13, 1942, Serial No. 430,718

5 Claims. (Cl. 88—14)

This invention relates to spectrophotometric measurement of reflectance particularly to the measurement of the body reflectance of specularly reflecting samples.

In the past considerable information with regard to the composition of various samples has been obtainable through the use of flickering-beam type recording spectrophotometers. Examples of such spectrophotometers are well illustrated in U. S. Letters Patent No. 2,107,836 and 2,126,410 issued on February 8, 1938, and August 9, 1938, respectively, to Orrin W. Pineo. Even the best of such spectrophotometers, however, will not give immediately useful readings with samples having a high gloss such as hard finished papers, certain inks, lacquers, paints, molded resins, ceramics, and other materials exhibiting similar phenomena. It is usually desirable to determine the body reflectance dependent upon the structure or composition of the material itself rather than the total reflectance which is obtained when a sample is run in a conventional type apparatus. In the case of samples where there is an appreciable surface gloss, specularly reflected light may comprise a large or even a major proportion of the total reflectance of the sample at a given wave-length.

As pointed out the specularly reflected light may comprise a major portion of the total reflectance. In addition it should be brought out that in most circumstances there is a certain minimum below which the total reflectance will never fall however low the body reflectance. For example, with plastics such as "Bakelite" this minimum usually occurs somewhere about 4%. Therefore, when only the body reflectance is desired, the readings obtained from a conventional type apparatus with the sample held in the conventional manner may be in error by 4% or more even with a very light sample. With dark samples the error will often be appreciably more than 50%. It is therefore readily apparent that for many purposes the elimination of this surface reflectance becomes highly important.

There are two principal methods of eliminating the specularly reflected light from the reading obtained with the spectrophotometer. The first of these is to reject specularly reflected light coming from the surface of the sample from the interior of the integrating sphere. The second of these comprises the provision of some means within the integrating sphere for eliminating the effect of the specular reflection.

The present invention relates to the first of these methods, namely that in which the specularly reflected light is rejected from the sphere by returning it out through the entrance window. The second of these methods forms the subject matter of my co-pending application, Serial No. 430,720 filed of even date, now United States Letters Patent No. 2,347,067.

In the past it has been proposed to eliminate the specularly reflected light by placing a lens of zero power or some similar form of adapter or "noflector" in contact with the surface of the sample so that all the specularly reflected light will be returned through the entrance window. This procedure, however, involves a number of serious limitations upon its practical use. First, it requires that the sample have a smooth surface, since specular reflection from irregular surfaces would be scattered to such an extent that it would not be readily returned. Secondly, since the specularly reflected light follows divergent paths the "noreflector" ordinarily must have a curved surface to focus the light on the window and the sample therefor must be one adapted to be fitted over this curve. This limited the types of samples which could be so tested to those which are on a flexible surface which can be bent around a curve or to materials such as inks, paints, and pigments and the like which could be directly placed on the back of the zero power lens.

The present invention in general comprises a method and means whereby the body reflectance of samples having appreciable specular reflectance may be evaluated whether the materials meet the requirements imposed by the prior art or not. The invention will be more fully discussed in connection with the drawing in which:

Figure 1 is a partially diagrammatic section of a conventional integrating sphere with the reference sample and sample to be tested in place;

Figure 2 shows an arrangement using a specially prepared sample;

Figure 3 shows one means of rejecting the specular reflection;

Figures 4 and 5 show various forms of the preferred embodiments of the present invention;

Figure 6 represents a greatly enlarged portion of Figure 4 showing the oil layer in detail.

Referring to Figure 1, 1 represents the integrating sphere of a conventional flicker type spectrophotometer having the two entrance windows 2 and 3 through which enter the divergent beams of light represented by the lines 4 and 5. The source of these beams forms no part of the present invention, is conventional and is not shown. The beam 4 falls upon a standard reflectance sample 6, of magnesium carbonate or the like, mounted in sample window 2' and is diffusely reflected into the interior of the sphere being picked up by a photo tube or photo cell 7 in the conventional manner. The beam 5 is represented as falling normally upon a sample 8, mounted in sample window 3'. Both the standard sample 6 and the sample to be tested 8 are held in place by some mounting means such as spring clips 11 and 11' or the like, which being conventional are not shown in the remaining figures. A part of the light will be specularly reflected from the plane surface of the sample as represented by the lines 9 and 10, fall upon the surface of the integrating sphere and be picked up by the light receiving device. The remainder of the beam 5 will be diffusely reflected in the same manner as is the light from the reference sample. Since it is one of the purposes of the present invention to provide a means whereby only the diffusely reflected light is to be compared with the total diffused reflectance from the reference sample, the diagram will serve to emphasize the type of objectionable reflectance which it is desired to eliminate. As will be seen from Figure 1 this is not done in a conventional type machine with conventional sample mountings.

Figure 2 illustrates one means whereby the effect of the specularly reflected light may be eliminated. This comprises forming the surface of the sample 12 into a curve such that it will focus all the specularly reflected light upon the entrance window 3 whereby it will pass from the integrating sphere and will not cause an inaccurate measurement. In this example, rather than form the sample around an adapter or "noflector," the "noflector" has been cut in the sample.

While this modification can be made to give fairly accurate results it has several serious drawbacks. First, it requires that the sample be capable of having its surface deformed in the necessary curve. Many substances are not so adaptable and in any case considerable time is required for the cutting. Secondly, the curve must be very accurately formed and the sample very accurately placed, otherwise it will focus the specularly reflected light upon a reflecting portion of the interior surface of the sphere and cause an abnormally high total reflectance reading since under normal conditions a certain amount of the light reflected from the surface of the sample would have passed out through one or the other of the entrance windows 2 or 3.

Figure 3 involves a modification of the integrating sphere of a conventional spectrophotometer to enable rejection of the specularly reflected light. In this case it is done by enlarging the entrance window through which the sample beam enters the sphere to such an extent that the specularly reflected light represented by lines 9 and 10 will pass out through the window. While this modification may be used to produce fairly accurate results it has the drawback that the structure of the sphere must be permanently altered. Enlarging the window in this way makes it too large for satisfactory use with transmission samples. Further, in order to restore the symmetry of the two halves of the sphere it will be necessary to enlarge the other window and this enlargement of one or both of the entrance windows decreases the effective areas inside the sphere.

Figure 4 shows one modification of a means capable of accomplishing the object of the present invention without modifying the sphere. A suitable transparent adapter 12 having a plane back surface and concave front surface is mounted on the sample and fills the sample window. The curved surface is so chosen that it will focus the specularly reflected light on the entrance window 3 in the same manner that was done with the curved surface of the sample itself in Figure 2. Interposed between the adapter and the sample is a thin layer of a suitable oil 13, having no appreciable spectral absorption and an index of refraction between that of the sample itself and the material of which the adapter is made. The adapter device may be held in place by any suitable means as by making the adapter integral with the reflectance sample holder. In most cases however, no special holding device will be required since the adhesive quality of the oil is such that the adapter will be held on the surface of the sample without any special support.

The use of a thin adapter of this type may be subject to a certain amount of objection on the grounds that the concave surface of the adapter will increase the internal reflection of the sample assembly and cause the percent of reflectance recorded by the apparatus to be too low. However, such little decrease as will occur in recorded reflectance may be substantially eliminated by the use of slightly modified adapters. An example of such modified adapters is shown at 14 in Figure 5. The critical feature in such modifications is that the rejector surface of the adapter is farther away from the surface of the sample itself and subtends a smaller angle at the sample than in the case of the thin adapter in Figure 4.

The external shape of the thick adapters may be considerably modified without departing from the scope of the present invention. For example, the adapter may, like adapter 14 of Figure 5, be merely a thickened form of the thin adapter 12 of Figure 4, and be tapered slightly to subtend a smaller angle. The thickness may be varied as desired. However, it is desirable to keep the amount of diffusely reflected light which escapes from the sphere along the adapter at a minimum. This is best accomplished as noted by tapering the adapter. The external shape of the adapter may be varied at will so that the taper may be a smooth curve as in Figure 5, may be a straight conical section, or may be carried out in a series of steps as may be thought best or be most convenient to attach to the instrument.

When using adapters, such as adapter 14, it may be necessary to compensate for the amount of light reflected from the front face of the adapter or absorbed in passing through it. This may be simply accomplished by reducing the standard beam. Any desired attenuating device for the standard beam may be used, perhaps the most convenient being a wedge diaphragm or a neutral filter. By running a blank on the apparatus using two similar samples, the machine may be readily adjusted so that equal amounts of light will fall on both samples.

Particularly important in connection with the present invention is the use of the oil layer 13. Its advantage is clearly shown in Figure 6. The oil layer effectively seals the joint between adapter and sample and thereby eliminates substantially all surface reflectance from the face of the sample whether specular or diffuse. Thus, a sample which has been accidentally scratched need not be rejected and samples which have matte, rough-ground or wavy surfaces as shown by the surface 8a in Figure 6 may be used without having their surfaces polished or otherwise modified as would have been necessary in carrying out any of the procedures proposed prior to the present invention.

It is a particularly advantageous feature of the present invention that it requires no permanent modification of the conventional apparatus. Thus, when it is not important to make allowance for the specular reflectance or when it is desired to use the machine to measure transmission samples, this may be readily done since the adapters disclosed herein need have no special mountings of such a nature as to interfere with the normal working of the machine.

Various modifications in the size and shape of the adapters may be readily made without departing from the scope of the present invention. The adapter itself may be made of any suitable transparent material such as glass or a polymerized acrylic resin. The presence of the oil thereon overcomes the necessity for having the surface of the adapter in contact with the oil an exact plane. The oil will overcome any slight irregularities in the adapter surface itself and will even permit the use, if so desired, of an adapter having both principal surfaces in the form of a curve. The latter type, however, is not as desirable as is an approximately flat surface since it is more difficult to place in the proper position. The diameter of the adapter is not critical. It must be sufficiently great so that the whole beam will fall on the surface of the adapter but otherwise may be of almost any desired size. If the adapter is larger than the sample window, it may be mounted on the exterior of the sphere. A preferable diameter is one which though greater than the beam diameter is smaller than the window since this is the easiest size to properly position.

I claim:

1. In a flickering-beam type spectrophotometer, an integrating sphere having at least one opening for the admission of light into the sphere; at least one sample mounting window; a transparent adapter located in said window, said adapter having one face forming a substantially continuous surface with that portion of the external sphere surface surrounding and adjacent to said window, the opposite face of the adapter being shaped to focus the specular component of the total reflected light resulting from incidence of substantially paraxial light thereon on said light-admitting opening and a mounting means adapted to hold a sample in contact with the surface formed by said adapter and sphere surface.

2. In a method of evaluating the body reflectance of a sample in which reflected light resulting from incidence of a beam of substantially paraxial light on the sample is concentrated on a light-responsive element by means of a light-integrating chamber, a portion of the surface of which is substantially non-reflecting; an improved method of preventing the specular component of the total reflected light from being reflected onto said light-responsive element by the light-integrating chamber which comprises the steps of covering the surface of the sample with a thin layer of a non-selectively absorbing oil having an index of refraction approximating but not exceeding that of the sample, placing the oil-covered surface of the sample in optical contact with one surface of a transparent, rigid adapter, the opposite surface of said adapter being shaped to focus the specular component of the total reflected light on said non-reflecting portion of the interior surface of the chamber when placed in said chamber in the path of the substantially paraxial light beam, said adapter having an index of refraction approximating but not exceeding that of said oil layer, and placing the adapter and sample in said chamber in the path of said substantially paraxial light beam.

3. A method according to claim 2 in which the specular component of the reflected light is focused on an opening in the surface of the light-integrating chamber.

4. A method according to claim 2 in which the specular component of the reflected light is focused on an opening in the surface of the light-integrating chamber and the beam of substantially paraxial light enters the chamber through the same opening.

5. In a flickering-beam type spectrophotometer, an integrating sphere having at least one opening for the admission of light into the sphere; at least one sample mounting window; a transparent adapter located in said window, said adapter having one face forming a substantially continuous surface with that portion of the external sphere surface surrounding and adjacent to said window, the opposite face being shaped to focus the specular component of the total reflected light resulting from incidence of substantially paraxial light thereon on a small area of a nonreflecting portion of the interior surface of the sphere, and a mounting means adapted to hold a sample in contact with the surface formed by said adapter and sphere surface.

WILLIAM A. SHURCLIFF.